PULSE LENGTH MULTIPLIER CIRCUIT

Filed Nov. 23, 1971

United States Patent Office 3,712,993
Patented Jan. 23, 1973

3,712,993

PULSE LENGTH MULTIPLIER CIRCUIT

Lamonte R. Edison, Kokomo, Ind., assignor to General Motors Corporation, Detroit, Mich.

Filed Nov. 23, 1971, Ser. No. 201,533
Int. Cl. H03k 1/14, 5/04
U.S. Cl. 307—267 4 Claims

ABSTRACT OF THE DISCLOSURE

A pulse length multiplier circuit produces an output pulse having a length equal to the length of an input pulse multiplied by a multiplication factor which is a function only of the ratio of a charging current and a discharging current. A charging voltage is developed by a pair of charging voltage resistances and is applied across a charging current resistance by one pair of opposite conductivity type emitter-follower transistors to define the charging current. A discharging voltage is developed by a pair of discharging voltage resistances and is applied across a discharging current resistance by another pair of opposite conductivity type emitter-follower transistors to define the discharging current. As a result, the multiplication factor is a function only of the ratio of the charging and discharging current resistances, the ratio of the charging voltage resistances, and the ratio of the discharging voltage resistances.

This invention relates to a pulse length multiplier circuit. More particularly, this invention relates to a circuit for producing an output pulse having a length equal to the length of an input pulse multiplied by a multiplication factor.

According to one aspect of the invention, the multiplication factor is a function only of the ratio of first and second control currents. A first control voltage is developed by a first pair of voltage divider resistances and is applied across a first current limiting resistance to define the first control current. A second control voltage is developed by a second pair of voltage divider resistances and is applied across a second current limiting resistance to define the second control current. Assuming the first and second control voltages are unaltered during application from the respective first and second pairs of voltage divider resistances to the respective first and second current limiting resistances, the multiplication factor is a function only of the ratio of the first and second current limiting resistances, the ratio of the first pair of voltage divider resistances, and the ratio of the second pair of voltage divider resistances. Preferably, the first and second current limiting resistances have like temperature versus resistance characteristics, the first pair of voltage divider resistances have like temperature versus resistance characteristics, and the second pair of voltage divider resistances have like temperature versus resistance characteristics. As a result, the multiplication factor is substantially temperature independent.

In another aspect of the invention, the first control voltage is applied from the first pair of voltage divider resistances across the first charging resistance through a first pair of opposite conductivity type transistors while the second control voltage is applied from the second pair of voltage divider resistances across the second current limiting resistance through a second pair of opposite conductivity type transistors. The first and second pairs of transistors are each connected in a two-stage cascade emitter-follower configuration to provide respective pairs of base-emitter junction voltages having like magnitude and opposite sense. Preferably, the base-emitter junction voltages in the respective first and second pairs of transistors also have like temperature versus voltage characteristics. As a result, the first and second control voltages are unaltered by fluctuations in temperature during application from the respective first and second pairs of voltage divider resistances to the respective first and second current limiting resistances.

These and other aspects and advantages of the invention will become more apparent by reference to the following detailed description of a preferred embodiment when considered in conjunction with the accompanying drawing.

Figure 1:
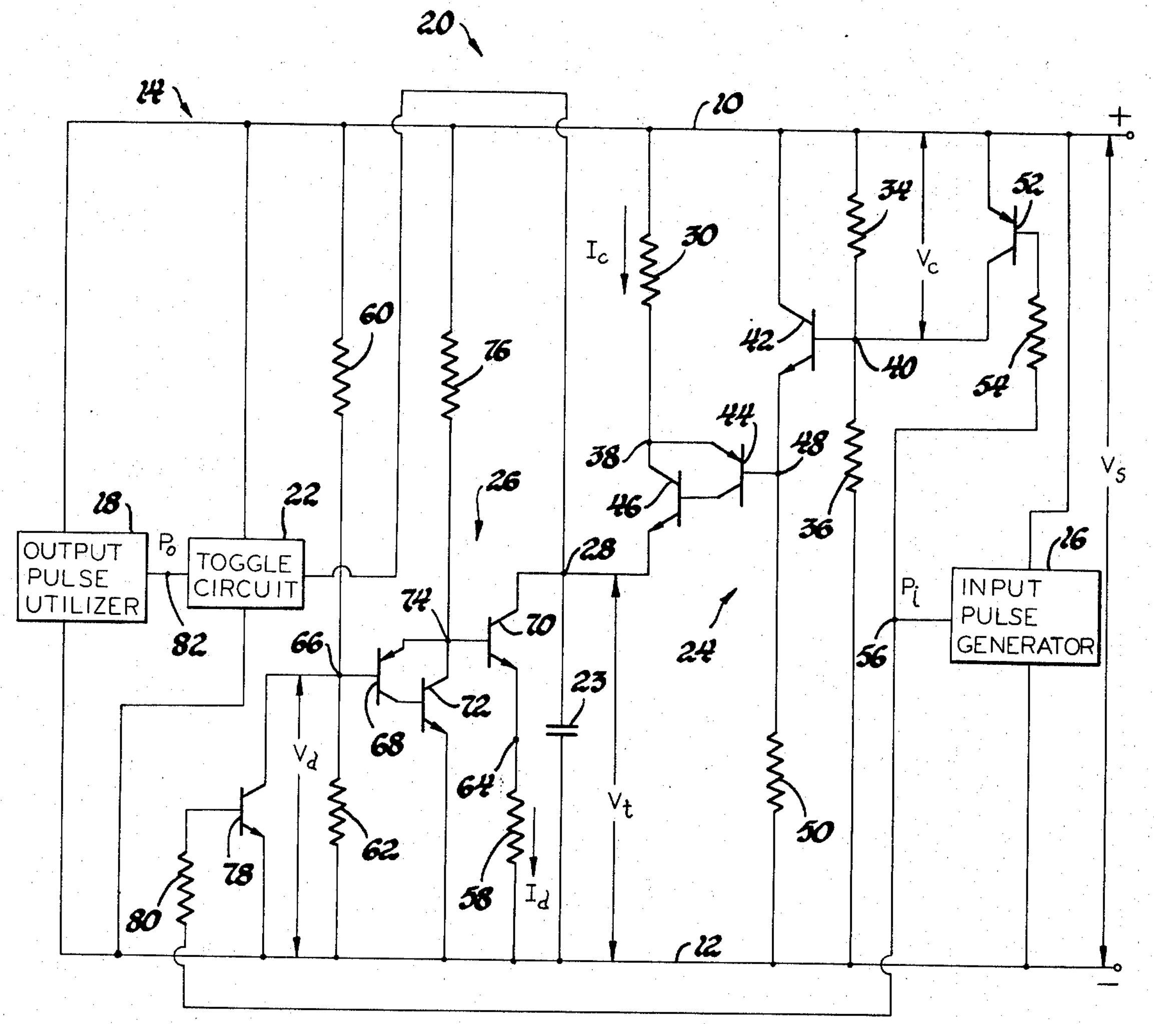
FIG. 1 is a schematic diagram of a pulse length multiplier circuit incorporating the principles of the invention.
Figure 2:
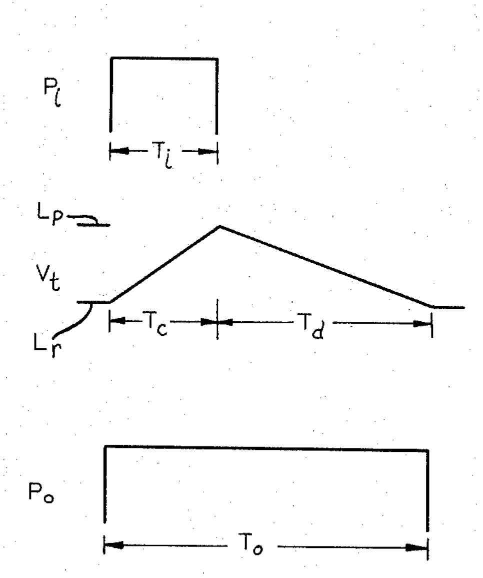
FIG. 2 is a graphic diagram of several waveforms useful in explaining the operation of the pulse length multiplier circuit illustrated in FIG. 1.

Referring to FIGS. 1 and 2, an electrical system includes a high potential line 10 and a low potential line 12 across which a direct current supply voltage $V_s$ is applied by a power source (not shown). The power source may take any convenient form, such as a conventional electrochemical battery.

A pulse length multiplier 14 is connected between an input pulse generator 16 and an output pulse utilizer 18. The input pulse generator 16 is connected between the high potential line 10 and the low potential line 12 for developing input pulses $P_i$ each having a period or length $T_i$ defined in response to a given input function. For example, the input pulse generator 16 may be an electronic fuel controller for producing input pulses $P_i$ each having a length $T_i$ determined as a function of at least one operating parameter of an internal combustion engine.

The pulse length multiplier 14 receives the input pulses $P_i$ from the input pulse generator 16, develops an output pulse $P_o$ in response to each input pulse $P_i$, and applies the output pulses $P_o$ to the output pulse utilizer 18. The output pulses $P_o$ each have a period or length $T_o$, given by the equation $$T_o=(MF)T_i \tag{1}$$

where MF is a multiplication factor. Thus, the length $T_o$ of the output pulses $P_o$ is equal to the length $T_i$ of the input pulses $P_i$ multiplied by the multiplication factor MF.

The output pulse utilizer 18 is connected between the high potential line 10 and the low potential line 12 for performing a given output function in response to the length $T_o$ of the output pulses $P_o$. For example, the output pulse utilizer 18 may be an electronic fuel injector for applying fuel to an internal combustion engine at a constant rate over the length $T_o$ of each of the output pulses $P_o$.

The pulse length multiplier 14 includes a timing circuit 20 and a toggle circuit 22. The timing circuit 20 includes a timing capacitor 23, a charging circuit 24 and a discharging circuit 26. The timing capacitor 23 is connected between a junction 28 and the low potential line 12 for developing a timing voltage $V_t$ across the capacitor 23 between the junction 28 and the low potential line 12. In a manner which will be more fully described later, the toggle circuit 22 is connected to the junction 28 to nominally maintain the amplitude of the timing voltage $V_t$ substantially constant at a reference level $L_r$ as shown in FIG. 2.

The charging circuit 24 comprises a constant current charging source including a current limiting resistor or charging current resistor 30 and a pair of voltage divider resistors or charging voltage resistors 34 and 36. The resistor 30 is connected between a junction 38 and the high potential line 10. The resistor 34 is connected between a junction 40 and the high potential line 10. The resistor 36 is connected between the junction 40 and the low potential line 12.

Further, the charging circuit 24 includes a pair of emitter-follower transistors 42 and 44 and an amplifier transistor 46. The transistors 42 and 46 are of the NPN junction type while the transistor 44 is of the PNP junction type. The base electrode of the transistor 42 is connected directly to the junction 40. The collector electrode of the transistor 42 is connected directly to the high potential line 10. The emitter electrode of the transistor 42 is connected directly to a junction 48. A biasing resistor 50 is connected between the junction 48 and the low potential line 12. In addition, the base electrode of the transistor 44 is connected directly to the junction 48. The emitter electrode of the transistor 44 and the collector electrode of the transistor 46 are connected directly to the junction 38. The collector electrode of the transistor 44 is connected directly to the base electrode of the transistor 46. The emitter electrode of the transistor 46 is connected directly to the junction 28.

In addition, the charging circuit 24 includes an input transistor 52 of the PNP junction type. An input resistor 54 is connected between an input terminal 56 and the base electrode of the transistor 52. The input terminal 56 is connected directly to the output of the input pulse generator 16. The emitter electrode of the transistor 52 is connected directly to the high potential line 10. The collector electrode of the transistor 52 is connected directly to the junction 40.

The discharging circuit 26 comprises a constant current discharging source including a current limiting resistor or discharging current resistor 58 and a pair of voltage divider resistors or discharging voltage resistors 60 and 62. The resistor 58 is connected between a junction 64 and the low potential line 12. The resistor 60 is connected between a junction 66 and the high potential line 10. The resistor 62 is connected between the junction 66 and the low potential line 12.

Further, the discharging circuit 26 includes a pair of emitter-follower transistors 68 and 70 and an amplifier transistor 72. The transistor 68 is of the PNP junction type while the transistors 70 and 72 are of the NPN junction type. The base electrode of the transistor 68 is connected directly to the junction 66. The emitter electrode of the transistor 68 and the collector electrode of the transistor 72 are connected directly to a junction 74. A biasing resistor 76 is connected between the junction 74 and the high potential line 10. The collector electrode of the transistor 68 is connected directly to the base electrode of the transistor 72. The emitter electrode of the transistor 72 is connected directly to the low potential line 12. The base electrode of the transistor 70 is connected directly to the junction 74. The emitter electrode of the transistor 70 is connected directly to the junction 64. The collector electrode of the transistor 70 is connected directly to the junction 28.

In addition, the discharging circuit 26 includes an input transistor 78 of the NPN junction type. An input resistor 80 is connected between the base electrode of the transistor 78 and the input terminal 56. The emitter electrode of the transistor 78 is connected directly to the low potential line 12. The collector electrode of the transistor 78 is connected directly to the junction 66.

Before proceeding to a description of the operation of the pulse length multiplier circuit 14, a more detailed description of some of the components within the timing circuit 20 is in order. The charging current resistor 30 exhibits a resistance $R_{cc}$ and the discharging current resistor 58 exhibits a resistance $R_{dc}$ where the resistances $R_{cc}$ and $R_{dc}$ have like temperature versus resistance characteristics. The charging voltage resistor 34 exhibits a resistance $R_{cv_1}$ and the charging voltage resistor 36 exhibits a resistance $R_{cv_2}$ where the resistance $R_{cv_1}$ and $R_{cv_2}$ have like temperature versus voltage characteristics. The discharging voltage resistor 60 exhibits a resistance $R_{dv_1}$ and the discharging voltage resistor 62 exhibits a resistance $R_{dv_2}$ where the resistances $R_{dv_1}$ and $R_{dv_2}$ have like temperature versus resistance characteristics.

Further, the emitter-follower transistor 42 exhibits a base-emitter junction voltage $V_{j_1}$ and the emitter-follower transistor 44 exhibits a base-emitter junction voltage $V_{j_2}$ where the junction voltages $V_{j_1}$ and $V_{j_2}$ have like magnitude and opposite polarity and have like temperature versus voltage characteristics. The emitter-follower transistor 68 exhibits a base-emitter junction voltage $V_{j_3}$ and the emitter-follower transistor 70 exhibits a base-emitter junction voltage $V_{j_4}$ where the junction voltages $V_{j_3}$ and $V_{j_4}$ have like magnitude and opposite sense and have like temperature versus voltage characteristics. All of the previously described constraints may be easily met through the proper selection of the various components within the timing circuit 20. Moreover, these constraints tend to be inherent where the timing circuit 20 is fabricated through the use of integrated circuit processing techniques.

Referring to FIGS. 1 and 2, when an input pulse $P_i$ is initiated at the input terminal 56, the input transistor 78 is rendered fully conductive through the biasing action of the resistor 80. With the transistor 78 turned on, the junction 66 is effectively clamped to the low potential line 12 thereby to render the transistors 68 and 72 fully conductive and the transistor 70 fully nonconductive. With the transistor 70 turned off, discharging of the capacitor 23 is terminated. In addition, when an input pulse $P_i$ is initiated at the input terminal 56, the input transistor 52 is rendered fully nonconductive through the biasing action of the resistor 54. With the transistor 52 turned off, the junction 40 is effectively unclamped from the high potential line 10 thereby to turn on the transistors 42, 44 and 46 in an emitter-follower configuration. With the transistors 42, 44 and 46 turned on, charging of the capacitor 23 is initiated. The combination of the transistors 44 and 46 acts as a single transistor of the PNP junction type. Thus, when the transistor 44 is turned on, the transistor 46 is also turned on. Conversely, when the transistor 44 is turned off, the transistor 46 is likewise turned off.

With the junction 40 unclamped from the high potential line 10, the charging voltage resistors 34 and 36 are responsive to the supply voltage $V_s$ to develop a charging voltage $V_c$, given by the equation (2) $$V_c=\frac{R_{cv_1}}{R_{cv_1}+R_{cv_2}}V_s$$

across the resistor 34 between the junction 40 and the high potential line 10. In response to the charging voltage $V_c$, the emitter-follower transistors 42 and 44 are turned on through the biasing action of the resistor 50 to apply the charging voltage $V_c$ across the charging current resistor 30 between the junction 38 and the high potential line 10 to develop a charging current $I_c$, given by the equation (3) $$I_c=\frac{V_c+(V_{j_1}+V_{j_2})}{R_{cc}}$$

through the resistor 30. Since the base-emitter junction voltages $V_{j_1}$ and $V_{j_2}$ have like magnitude and opposite sense, the quantity $(V_{j_1}+V_{j_2})$ is 0. Moreover, since the base-emitter junction voltages $V_{j_1}$ and $V_{j_2}$ have like temperature versus voltage characteristics, the quantity $(V_{j_1}+V_{j_2})$ is 0 regardless of fluctuations in ambient temperature. Consequently, the charging current $I_c$ is given by the equation (4) $$I_c=\frac{V_c}{R_{cc}}$$

The charging current $I_c$ is applied through the transistor 46 to the junction 28 to charge the timing capacitor 23. As a result, the amplitude of the timing voltage $V_t$ increases from the reference level $L_T$ at a charging rate determined by the magnitude of the charging current $I_c$. The amplitude of the timing voltage $V_t$ increases until it reaches a peak level $L_p$ at the termination of the input pulse $P_i$. Hence, a charge period $T_c$ is defined between the time when an input pulse $P_i$ is initiated and the time when the input pulse $P_i$ is terminated. In other words, the charge period $T_c$ is equal to the length $T_i$ of the input pulse $P_i$. Therefore, the magnitude of the peak level $L_p$ is directly proportional to the length $T_i$ of the input pulse $P_i$.

When an input pulse $P_i$ is terminated at the input terminal 56, the input transistor 52 is rendered fully conductive through the biasing action of the resistor 54. With the transistor 52 turned on, the junction 40 is effectively clamped to the high potential line 10 thereby to render the transistor 42 fully conductive and the transistors 44 and 46 fully nonconductive. With the transistors 44 and 46 turned off, charging of the capacitor 23 is terminated. In addition, when an input pulse $P_i$ is terminated at the input terminal 56, the input transistor 78 is rendered fully nonconductive through the biasing action of the resistor 80. With the transistor 78 turned off, the junction 66 is effectively unclamped from the low potential line 12 thereby to turn on the transistors 68, 72 and 74 in an emitter-follower configuration. With the transistors 68, 72 and 74 turned on, discharging of the capacitor 23 is initiated. The combination of the transistors 68 and 72 acts as a single transistor of the PNP junction type. Thus, when the transistor 68 is turned on, the transistor 72 is also turned on.

With the junction 66 unclamped from the low potential line 12, the discharging voltage resistors 60 and 62 are responsive to the supply voltage $V_s$ to develop a discharging voltage $V_d$, given by the equation $$V_d = \frac{R_{dv_2}}{R_{dv_1}+R_{dv_2}} V_s \qquad (5)$$

across the resistor 62 between the junction 66 and the low potential line 12. In response to the discharging voltage $V_d$, the emitter-follower transistors 68 and 70 are turned on through the biasing action of the resistor 76 to apply the discharging voltage $V_d$ across the discharging current resistor 58 between the junction 64 and the low potential line 12 to develop a discharging current $I_d$, given by the equation $$I_d = \frac{V_d + (V_{j_3} + V_{j_4})}{R_{dc}} \qquad (6)$$

through the resistor 58. Since the base-emitter junction voltages $V_{j_3}$ and $V_{j_4}$ have like magnitude and opposite sense, the quantity $(V_{j_3}+V_{j_4})$ is 0. Moreover, since the base-emitter junction voltages $V_{j_3}$ and $V_{j_4}$ have like temperature versus voltage characteristics, the quantity $(V_{j_3}+V_{j_4})$ is 0 regardless of fluctuations in ambient temperature. Accordingly, the discharging current $I_d$ is given by the equation $$I_d = \frac{V_d}{R_{dc}} \qquad (7)$$

The discharging current $I_d$ is drawn through the transistor 70 from the junction 28 to discharge the timing capacitor 23. As a result, the amplitude of the timing voltage $V_t$ decreases from the peak level $L_p$ at a discharging rate determined by the magnitude of the discharging current $I_d$. The amplitude of the timing voltage $V_t$ decreases until it reaches the reference level $L_r$ at which it is thereafter maintained. Hence, a discharge period $T_d$ is defined between the time when an input pulse $P_i$ is terminated and the time when the timing voltage $V_t$ arrives at the reference level $L_r$. When an input pulse $P_i$ is again initiated at the input terminal 56, the previously described operating cycle is repeated.

Alternately, the charging current $I_c$ may be applied to the capacitor 23 continually by disconnecting the collector electrode of the input transistor 52 from the junction 40 thereby to effectively disable the transistor 52. In this event, the operation of the timing circuit 20 is as previously described, provided that the discharging current $I_d$ is greater than the charging current $I_c$. Conversely, the discharging current $I_d$ may be drawn from the capacitor 23 continually by disconnecting the collector electrode of the input transistor 78 from the junction 66 thereby to effectively disable the transistor 78. In this event, the operation of the timing circuit is as previously described, provided that the charging current $I_c$ is greater than the discharging current $I_d$.

The toggle circuit 22 performs two distinct functions. First, the toggle circuit 22 nominally maintains the amplitude of the timing voltage $V_t$ substantially constant at the reference level $L_r$. Second, the toggle circuit 22 produces an output pulse $P_o$ in response to each input pulse $P_i$. The output pulses $P_o$ are produced at an output terminal 82 which is connected directly to the input of the output pulse utilizer 18. Specifically, the output pulses $P_o$ are each initiated in coincidence with the initial departure of the timing voltage $V_t$ from the reference level $L_r$ and are each terminated in coincidence with the subsequent arrival of the timing voltage $V_t$ at the reference level $L_r$. Thus, the length $T_o$ of the output pulses $P_o$ is given by the equation $$T_o = T_c + T_d \qquad (8)$$

One embodiment of a toggle circuit for accomplishing the previously described function is illustrated in a copending patent application A–16,677.

Further, as indicated by the Equation 1 the length $T_o$ of the output pulses $P_o$ is equal to the length $T_i$ of the input pulses $P_i$ multiplied by a multiplication factor MF. Generally, the multiplication factor MF is given by the equation $$MF = \frac{I_c}{I_d} + K \qquad (9)$$

where K is a constant which is either +1, 0 or −1. In the illustrated embodiment of the pulse length multiplier 14, the constant K is +1.

More particularly, the constant K is +1 where:

(1) the length $T_o$ of the output pulses $P_o$ is equal to the charge period $T_c$ plus the discharge period $T_d$; and
(2) the charging current $I_c$ is applied to the capacitor 23 only during the charge period $T_c$ while the discharging current $I_d$ is drawn from the capacitor 23 only during discharge period $T_d$.

The constant K is 0 where:

(1) the length $T_o$ of the output pulses $P_o$ is equal to the charge period $T_c$ plus the discharge period $T_d$; and
(2) the discharging current $I_d$ is drawn from the capacitor 23 continually while the charging current $I_c$ is applied to the capacitor 23 only during the charge period $T_c$ where the charging current $I_c$ is greater than the discharging current $I_d$.

Alternately, the constant K is 0 where:

(1) the length $T_o$ of the output pulses $P_o$ is equal to the discharge period $T_d$ only; and
(2) the charging current $I_c$ is applied to the capacitor 23 only during the charge period $T_c$ while the discharging current $I_d$ is drawn from the capacitor 23 only during the discharge period $T_d$.

Lastly, the constant K is −1 where:

(1) the length $T_o$ of the output pulses $P_o$ is equal to the discharge period $T_d$ only; and
(2) the discharging current $I_d$ is drawn from the capacitor 23 continually while the charging current $I_c$ is applied to the capacitor 23 only during the charge period $T_c$ where the charging current $I_c$ is greater than the discharging current $I_d$.

The simultaneous solution of the Equations 2, 4, 5, 7 and 9 for the multiplication factor MF yields the equation

(10) $$MF=\frac{R_{dc}}{R_{cc}}\left[\frac{1}{1+\frac{R_{cv_2}}{R_{cv_1}}}\right]\left[1+\frac{R_{dv_1}}{R_{dv_2}}\right]+K$$

Hence, the multiplication factor MF is a function only of the ratio $R_{dc}/R_{cc}$ of the discharging current resistance $R_{dc}$ to the charging current resistance $R_{cc}$, the ratio $R_{cv_2}/R_{cv_1}$ of the charging voltage resistance $R_{cv_2}$ to the charging voltage resistance $R_{cv_1}$, and the ratio $R_{dv_1}/R_{dv_2}$ of the discharging voltage resistance $R_{dv_1}$ to the discharging voltage resistance $R_{dv_2}$. Further, since the charging current and discharging current resistances $R_{cc}$ and $R_{dc}$ have like temperature versus resistance characteristics, the ratio $R_{dc}/R_{cc}$ remains substantially constant regardless of fluctuations in ambient temperature. Similarly, since the charging voltage resistances $R_{cv_1}$ and $R_{cv_2}$ have like temperature versus resistance characteristics, the ratio $R_{cv_2}/R_{cv_1}$ remains substantially constant regardless of fluctuations in ambient temperature. Likewise, since the discharging voltage resistances $R_{dv_1}$ and $R_{dv_2}$ have like temperature versus resistance characteristics, the ratio $R_{dv_1}/R_{dv_2}$ remains substantially constant regardless of fluctuations in ambient temperature. As a result, the multiplication factor MF is substantially independent of fluctuations in ambient temperature.

It will now be appreciated that the previously described preferred embodiment of the invention is shown for illustrative purposes only. Accordingly, various alterations and modifications may be made to the preferred embodiment without departing from the spirit and scope of the invention.

What is claimed is:

1. For an electrical system providing a supply voltage $V_s$, a multiplier circuit for extending the length of an input pulse, comprising: means including a capacitance for developing a timing voltage thereacross which is nominally maintained at a reference level; means including a charging current resistance $R_{cc}$ and a discharging current resistance $R_{dc}$ having like temperature versus resistance characteristics; means including a pair of charging voltage resistance $R_{cv_1}$ and $R_{cv_2}$ having like temperature versus resistance characteristics for developing a charging voltage $V_c$ given by the equation (1) $$V_c=\frac{R_{cv_1}}{R_{cv_1}+R_{cv_2}}V_s$$

means for applying the charging voltage $V_c$ across the charging current resistance $R_{cc}$ to develop a charging current $I_c$ given by the equation (2) $$I_c=\frac{V_c}{R_{cc}}$$

which is applied to the capacitance in response to the presence of an input pulse; means including a pair of discharging voltage resistances $R_{dv_1}$ and $R_{dv_2}$ having like temperature versus resistance characteristics for developing a discharge voltage $V_d$ given by the equation (3) $$V_d=\frac{R_{dv_2}}{R_{dv_1}+R_{dv_2}}V_s$$

means for applying the discharging voltage $V_d$ across the discharging current resistance $R_{dc}$ to develop a discharging current $I_d$ given by the equation (4) $$I_d=\frac{V_d}{R_{dc}}$$

which is drawn from the capacitance in response to the absence of an input pulse; and means for producing an output pulse having a length defined between the time when the timing voltage initially departs from the reference level until the time when the timing voltage subsequently arrives at the reference level so that the length of the output pulse is equal to the length of the input pulse multiplied by a multiplication factor MF given by the equation (5) $$MF=\frac{I_c}{I_d}+K$$

where K is a constant, the simultaneous solution of the Equations 1–5 for the multiplication factor MF yielding the equation (6) $$MF=\frac{R_{dc}}{R_{cc}}\left[\frac{1}{1+\frac{R_{cv_2}}{R_{cv_1}}}\right]\left[1+\frac{R_{dv_1}}{R_{dv_2}}\right]+K$$

which indicates that the multiplication factor MF is substantially independent of variations in the various resistances due to fluctuations in ambient temperature.

2. For an electrical system providing a supply voltage $V_s$, a multiplier circuit for extending the length $T_i$ of an input pulse $P_i$, comprising: means including a capacitor having a capacitance C for developing a timing voltage $V_t$ thereacross which is nominally maintained at a reference level $L_r$; means including a charging current resistor and a discharging current resistor having respective resistances $R_{cc}$ and $R_{dc}$ exhibiting like temperature versus resistance characteristics; means including a pair of charging voltage resistors having respective resistances $R_{cv_1}$ and $R_{cv_2}$ exhibiting like temperature versus resistance characteristics for developing a charging voltage $V_c$ given by the equation (1) $$V_c=\frac{R_{cv_1}}{R_{cv_1}+R_{cv_2}}V_s$$

means including a pair of opposite conductivity type junction transistors interconnected in a cascade emitter-follower configuration to provide respective base-emitter junction voltages $V_{j_1}$ and $V_{j_2}$ having like magnitudes and opposite sense and exhibiting like temperature versus voltage characteristics for applying the charging voltage $V_c$ across the charging current resistance $R_{cc}$ to develop a charging current $I_c$ given by the equation (2) $$I_c=\frac{V_c+(V_{j_1}+V_{j_2})}{R_{cc}}=\frac{V_c}{R_{cc}}$$

where the quantity $(V_{j_1}+V_{j_2})=0$; means for applying the charging current $I_c$ to the capacitance C of the capacitor to increase the timing voltage $V_t$ from the reference level $L_r$ to a peak level $L_p$ in response to the presence of an input pulse $P_i$; means including a pair of discharging voltage resistors having respective resistances $R_{dv_1}$ and $R_{dv_2}$ exhibiting like temperature versus resistance characteristics for developing a discharging voltage $V_d$ given by the equation (3) $$V_d=\frac{R_{dv_2}}{R_{dv_1}+R_{dv_2}}V_s$$

means including a pair of opposite conductivity type junction transistors interconnected in a cascade emitter-follower configuration to provide respective base-emitter junction voltages $V_{j_3}$ and $V_{j_4}$ having like magnitude and opposite sense and exhibiting like temperature versus voltage characteristics for applying the discharging voltage $V_d$ across the discharging current resistance $R_{dc}$ to develop a discharging current $I_d$ given by the equation (4) $$I_d=\frac{V_d+(V_{j_3}+V_{j_4})}{R_{dc}}=\frac{V_d}{R_{dc}}$$

where the quantity $(V_{j_3}+V_{j_4})=0$; means for drawing the dicharging current $I_d$ from the capacitance C of the capacitor to decrease the timing voltage $V_t$ from the peak level $L_p$ to the reference level $L_T$ in response to the absence of an input pulse $P_i$; and means for producing an output pulse $P_o$ having a length $T_o$ defined between the initial departure of the timing voltage $V_t$ from the reference level $L_T$ until the subsequent arrival of the timing voltage $V_t$ at the reference level $L_T$ so that the length $T_o$ of the output pulse $P_o$ is given by the equation $$T_o=(MF)T_i \tag{5}$$

where MF is a multiplication factor given by the equation $$MF=\frac{I_c}{I_d}+K \tag{6}$$

where K is a constant which is +1 or −1 or 0, the simultaneous solution of Equations 1–6 for the multiplication factor MF yielding the equation $$MF=\frac{R_{dc}}{R_{cc}}\left[\frac{1}{1+\frac{R_{cv_2}}{R_{cv_1}}}\right]\left[1+\frac{R_{dv_1}}{R_{dv_2}}\right]+K \tag{7}$$

which indicates that the multiplication factor MF is substantially independent of variations in the supply voltage $V_s$ and in the capacitance C as well as independent of variations in the base-emitter junction voltages $V_{j1}-V_{j4}$ and in the resistances $R_{cc}$, $R_{dc}$, $R_{cv}$ and $R_{dv}$ due to fluctuations in ambient temperature.

3. A pulse length multiplier circuit, comprising: means including first and second current limiting resistances; means including a first pair of voltage divider resistances having like temperature versus resistance characteristics, the first pair of voltage divider resistances connected to develop a first control voltage which is applied across the first current limiting resistance to define a first control current; means including a second pair of voltage divider resistances having like temperature versus resistance characteristics, the second pair of voltage divider resistances connected to develop a second control voltage which is applied across the second current limiting resistance to define a second control current; means responsive to the first and second control currents for producing an output pulse having a length equal to the length of an input pulse multiplied by a multiplication factor which is a function only of the ratio of the first and second control currents which in turn is a function only of the ratio of the first and second current limiting resistances, the ratio of the first pair of voltage divider resistances and the ratio of the second pair of voltage divider resistances, whereby the multiplication factor is substantially temperature independent.

4. A pulse length multiplier circuit, comprising: means including first and second current limiting resistances; means including a first pair of voltage divider resistances having like temperature versus resistance characteristics, the first pair of voltage divider resistances connected to develop a first control voltage; means including a first pair of emitter-follower transistors providing respective base-emitter junction voltages having like magnitude and opposite sense and having like temperature versus voltage characteristics, the first pair of emitter-follower transistors connected to apply the first control voltage across the first current limiting resistance to define a first control current; means including a second pair of voltage divider resistances having like temperature versus resistance characteristics, the second pair of voltage divider resistances connected to develop a second control voltage; means including a second pair of emitter-follower transistors providing respective base-emitter junction voltages having like magnitude and opposite sense and having like temperature versus voltage characteristics, the second pair of emitter-follower transistors connected to apply the second control voltage across the second current limiting resistance to define a second control current; and means responsive to the first and second control currents for producing an output pulse having a length equal to the length of an input pulse multiplied by a multiplication factor which is a function only of the ratio of the first and second control currents which in turn is a function only of the ratio of the first and second current limiting resistances, the ratio of the first pair of voltage divider resistances, and the ratio of the second pair of voltage divider resistances, whereby the multiplication factor is substantially temperature independent.

References Cited

UNITED STATES PATENTS

| | | | |
|---|---|---|---|
| 3,152,267 | 10/1964 | Clapper | 328—58 X |
| 3,346,743 | 10/1967 | Strenglein | 307—267 |
| 3,473,050 | 10/1969 | Groom | 307—267 |
| 3,638,045 | 1/1972 | Hughes | 307—267 |

STANLEY D. MILLER, Jr., Primary Examiner

U.S. Cl. X.R.

307—246; 328—58